(12) United States Patent
Fillery et al.

(10) Patent No.: US 8,959,721 B2
(45) Date of Patent: Feb. 24, 2015

(54) STEAM TREATING OF FODDER

(75) Inventors: Brian Gordon Fillery, Marlborough (GB); Timothy Michael Oliver, Chiddingford (GB)

(73) Assignee: Propress Equine Limited, London (GB)

( * ) Notice: Subject to any disclaimer, the term of this patent is extended or adjusted under 35 U.S.C. 154(b) by 181 days.

(21) Appl. No.: 12/385,810

(22) Filed: Apr. 21, 2009

(65) Prior Publication Data

US 2010/0080878 A1    Apr. 1, 2010

(30) Foreign Application Priority Data

Sep. 30, 2008  (GB) .................................. 0817846.9

(51) Int. Cl.
*A23K 1/00*    (2006.01)

(52) U.S. Cl.
USPC .............................. 19/65 R; 19/66 R; 422/26

(58) Field of Classification Search
USPC ......... 426/448, 622, 463, 516, 460, 569, 511, 426/520–521, 281; 99/516, 467, 534, 536; 131/300; 414/665; 56/DIG. 5; 19/66 R, 19/65 R; 68/5 R, 5 C
See application file for complete search history.

(56) References Cited

U.S. PATENT DOCUMENTS

| | | | |
|---|---|---|---|
| 1,332,629 A * | 3/1920 | McIntyre ......................... 99/533 |
| 4,383,538 A * | 5/1983 | Beard et al. .................... 131/300 |
| 4,450,178 A * | 5/1984 | Korsgaard ........................ 426/69 |
| 4,474,790 A * | 10/1984 | Nisato et al. ................... 514/350 |
| 4,604,857 A | 8/1986 | Maher |
| 4,705,936 A * | 11/1987 | Fowler ........................... 392/326 |
| 6,126,985 A * | 10/2000 | Cox ................................ 426/636 |
| 6,454,996 B1 | 9/2002 | Lin |

FOREIGN PATENT DOCUMENTS

| | | |
|---|---|---|
| GB | 2338167 | 12/1999 |
| GB | 2374513 | 10/2002 |
| GB | 2387311 | 10/2003 |
| GB | 2454969 | 5/2009 |
| RU | 2099989 | 12/1997 |
| SU | 588968 | 1/1978 |

OTHER PUBLICATIONS

English Abstract SU469455 including foreign patent document SU469455; Krasd Food, Aug. 26, 1975; p. 1-4.*
http://www.thefreedictionary.com/bale, date N/A; pp. 4.*

(Continued)

*Primary Examiner* — Steven Leff
(74) *Attorney, Agent, or Firm* — Hamre, Schumann, Mueller & Larson, P.C.

(57) ABSTRACT

An apparatus for and method of steam treatment of fodder, for example animal fodder which is typically in baled form. The purpose of steam treating is to kill mesophilic and thermophilic mould spores that are either attached to the fodder or detach when disturbed and become airborne. These airborne particles are associated with respiratory problems, infections and allergies to livestock as well as humans. The apparatus for steam treating fodder comprises at least one steam distribution manifold, which has a plurality of lances adapted to penetrate a bale of fodder so that steam is supplied to the interior volume of the fodder.

18 Claims, 2 Drawing Sheets

(56) References Cited

OTHER PUBLICATIONS

International Search Report in Great Britain Appl. No. GB0817846.9 (now granted GB patent No. 2454969) dated Jan. 9, 2009.
PCT International Search Report in PCT/GB2009/002319 dated Feb. 5, 2010.
Taylor, et al., "The effect of 5 different wetting treatments on the microbial concentration in hay for horses", Royal Agriculture College, Poster—1 page.
Taylor, et al., "The effect of 5 different wetting treatments on the microbial concentration in hay for horses", Royal Agriculture College, Abstract—1 page.
Propress Equine, "Improve Hay Improve Health Improve Performance", Haygrain Hay Steamers, Brochure, 8 pages.
Haygrain, "More than just hot air...", Landmark, Royal Agricultural College, Issue 9, 2010-2011, cover and p. 19.
"Recent studies into the efficacy of the HG 1000 and HG 600 Haygrain steamers", The University College at Cirencester, Royal Agricultural College, pp. 1-13.

* cited by examiner

STEAM TREATING OF FODDER

This application claims priority from GB 0817846.9, filed Sep. 30, 2008 in the UK, the entirety of which is explicitly incorporated herein by reference.

BACKGROUND OF THE INVENTION

1. Field of the Invention

This invention relates generally to an apparatus for and method of steam treating of fodder, for example animal fodder (such as grasses, herbaceous legumes, tree legumes, silage and crop residues), which is typically in baled form, which is intended to include bales as well as retaining nets, baskets or similar receptacles.

2. Background of the Related Art

The purpose of steam treating is to kill mesophilic and thermophilic mould spores that are either attached to the fodder or detach when disturbed and become airborne. These airborne particles are commonly assumed as dust spores, together with any living organisms and can include insects and the like. The purpose therefore of treating the fodder is to kill all the aforesaid prior to the fodder being fed to livestock; thus reducing the risks of creating or aggravating respiratory problems, infections and allergies from such or similar organisms. The problem associated with respiratory conditions, infections and allergies applies to, both livestock being fed as well as humans handling the fodder or when preparing and feeding the fodder to livestock.

Most forms of livestock are fed predominantly on conserved fodder from manmade bales; in their whole, in part, or detached from the whole bale and inserted in a receptacle such as a net or basket.

Fodder is one of the cheapest and most widely available natural forms of feeding livestock and provides most of the nutrients required. When fodder, such as grasses and crop residues, is cut, it is usually compressed into bales for ease of storage and manoeuvrability. All fodder contains leaf shatter, soil, mesophilic moulds, plant particles, fragments of sundry inorganic materials, bacteria, fungi and fungal spores, insects, and other organisms in varying amounts. When the fodder has been cut and stored additional organisms (thermophilic actinomycetes) are also present. All of this matter is generally classified as dust. Much of this dust is present in particles of less than 5 microns in diameter (respirable particles) and these particles can cause an allergic reaction within some livestock (e.g. horses and certain goat species). The allergic reaction is precipitated by a hypersensitivity to the respirable particles which leads to airway inflammation, bronchoconstriction and accumulation of mucoid secretion in the animal's airways.

Clinical signs such as coughing and reduced capacity for exercise are persistent. These conditions include the well known Recurrent Airway Obstruction (RAO)—also known as Chronic Obstructive Pulmonary Disorder (COPD)—and are responsible for a significant loss of revenue in terms of days in training and reduced performance. Moreover these respirable particles are the cause of the debilitating condition in humans known as Farmers Lung, as well as more common hayfevers. Some livestock owners soak their fodder, such as hay, to reduce the number of airborne particles released during feeding.

However, the initial handling of the material usually results in the dust becoming airborne and present in the atmosphere exposing animals and humans alike to hazardous respirable particles. While soaking fodder has proved effective in reducing respirable particle numbers, it does not kill the fungi and bacteria present and thus ingestion of these pathogens still occurs and can lead to other associated problems, particularly in breeding livestock. Furthermore soaking has been scientifically proven to leach some of the nutritional content from the fodder; and produces a post-soak liquid that has a high biological oxygen demand classifying it as an environmental pollutant.

Examples of steam treating fodder are described in UK Patent Application GB 2 338 167 A (Meech & Davis).

Another type of fodder steam treatment system is described in UK Patent Application GB 2 387 311 A (Bottomley).

Although the aforementioned systems operated with a reasonable degree of success they suffered from a number of drawbacks.

Another type of hay steamer is made and sold by Happy Horse Products limited and includes a conventional steam generator which delivers steam, via a lance, into loosely packed fodder which is contained in a bag. In the event that the bag is waterproof steam condenses in the bag with the result that there is a build up of hot water condensate in the bag and the aforementioned risk of leaching of nutrients from the fodder. In the event that the bag is permeable, a disadvantage of this system is that fodder has to be handled twice. Firstly it needs to be removed from a bale or hay rick and placed in the bag; then it has to be removed from the bag for feeding.

SUMMARY OF THE INVENTION

In accordance with the principles of the present invention, an apparatus for steam treating fodder comprises a steam manifold adapted to receive steam from a source of steam. The steam manifold defines passages for distributing steam to a plurality of lances. The lances are adapted so that, in use, they penetrate a bale or receptacle of fodder. Steam is thereby supplied to an interior volume of the bale or receptacle of fodder.

In accordance with another aspect of the invention, a method for steam treating a bale or receptacle of fodder comprises receiving steam at a manifold from a source of steam. The manifold defines passages for distributing steam to a plurality of lances. The lances are adapted so that, in use, they penetrate a bale or receptacle of fodder. Steam is thereby supplied to an interior volume of the bale or receptacle of fodder.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

According to a first aspect of the invention an apparatus for steam treating fodder includes a steam manifold that is adapted to receive steam from a source, the manifold defines passages for distributing steam to a plurality of lances, said lances being adapted so that, in use, they penetrate a bale or receptacle of fodder, whereby steam is supplied to the interior volume of the bale or receptacle of fodder.

Ideally the steam manifold, in use, is arranged to impale a bale of fodder, by placing the bale thereon, thus the weight of the bale assists in the process of ensuring the lances penetrate into the bulk of the bale of fodder.

The manifold may be adapted to rest on the ground or floor of an area and a bale may be placed on it or the manifold may be driven into a bale. Whichever technique is used there is a single action involved in steam treating the fodder and once treated, any baler twine or other binding is cut and the fodder can be distributed. Therefore the process is quick to implement and a user is free to do other things whilst a bale of fodder is steam treated.

The apparatus is preferably formed from a strong and heat resistant material, such as stainless steel, other metals or synthetic plastics material which is able to withstand temperatures in excess of 110 degrees Centigrade.

The manifold ideally includes a plurality of lances, which may be in the form of prongs or spikes, each being adapted to impale a bale so that they penetrate deep into the bale, thereby enabling steam to pass into the bulk of the bale and percolate from the centre outwards. This ensures deep and thorough heating—and thus steam treatment—of the fodder.

There may be two, but ideally there are three, four, five or more lances arranged in an array so that the lances are in a form that enhances even distribution of steam throughout the bale. Again ensuring deep and thorough heating—and thus steam treatment—of the fodder.

Ideally the apparatus includes a heater which has an immersion element and is adapted for use with either 240 Volts or 110 Volts. The heater generates steam in the well known manner.

Figure 1:
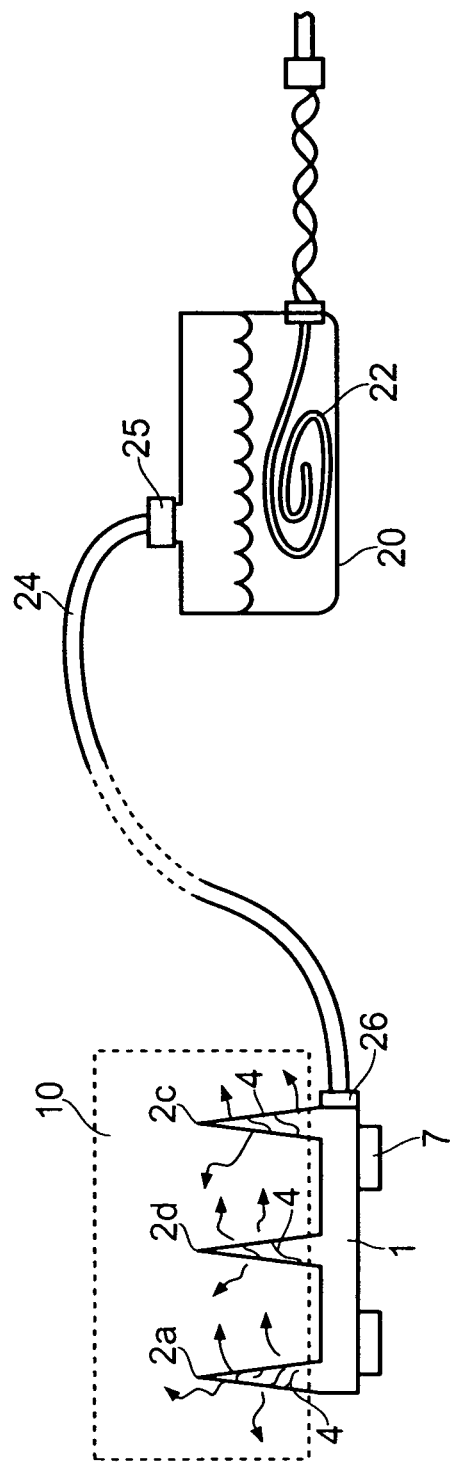
FIG. 1 shows an overall diagrammatical view of one embodiment of the invention and illustrates the principle of operation.

FIG. 1 shows an overall diagrammatical view of one embodiment of the invention and illustrates the principle of operation.

Referring to FIG. 1 there is shown a diagrammatic representation of an apparatus for steam treatment of fodder.

Referring to FIG. 1 there is shown in general a steam treatment of fodder comprising a water reservoir 20 in which is located a heating element 22. The water reservoir can also be a sealed vessel and thus capable of heating water to more than its normal boiling point. A high pressure flexible hose 24, which is ideally insulated, conducts steam from the reservoir to a manifold, ideally via a flexible or universal joints 25 and 26. The manifold 1 is what distributes the steam into a bale 10.

The apparatus is connected by means of pipe work to a steam generator in reservoir and optionally includes conventional safety equipment such as thermostatic settings, boil dry warning and residual current detectors (RCD) for use in damp and outdoor environments.

Figure 2:
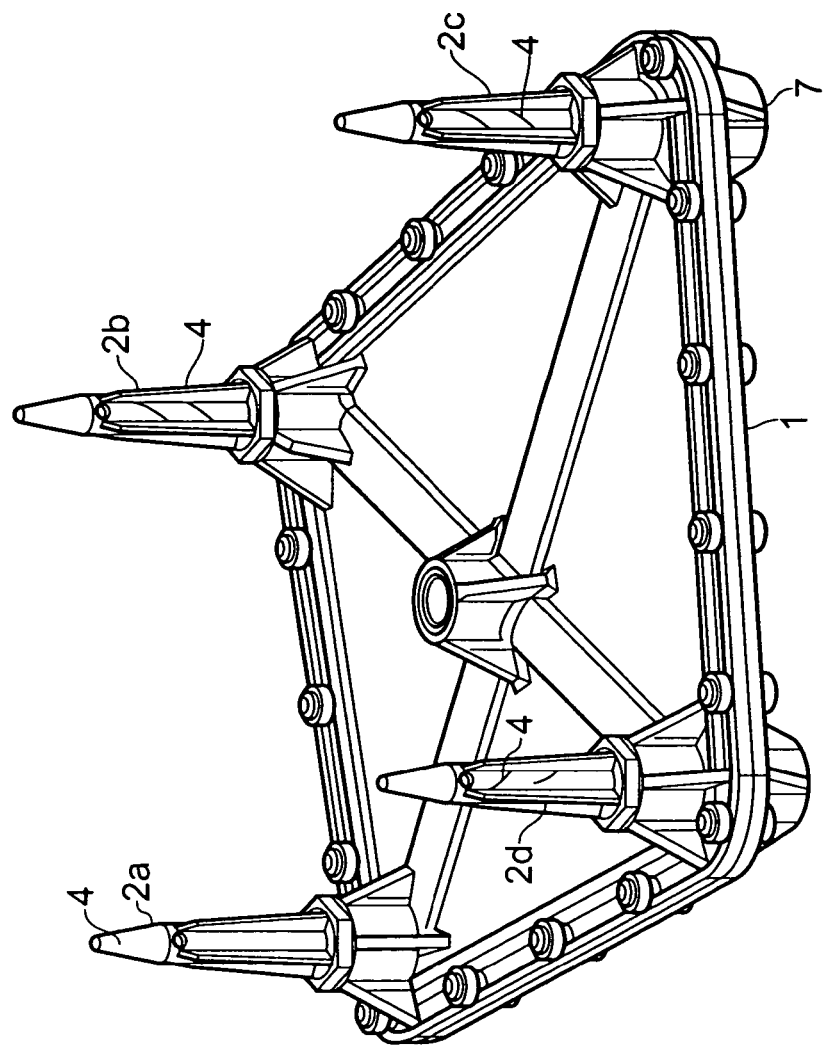
FIG. 2 shows an overall view of an example of a manifold.

FIG. 2 shows a manifold, which is in the form of a generally square frame and has passages 20 formed therein for distribution of steam The manifold 1 is fitted with a number of substantially vertical lances 2, which are in communication with the passages 20. Each lance 2 has a pointed end 3 for ease of penetration into a compacted bale or receptacles of fodder 10. Lances 2 have apertures 4, extending a proportion of their length, for the release and distribution of steam and condensed steam into the centre of the fodder. The supply of steam may be switched on or off by way of a trigger or other valve or switch (not shown).

Apertures 4 may be vertically disposed or they may be in the form of slits or slots, extending lengthwise or helically about circular lances 2. Alternatively the apertures may take the form of holes formed in the lances so that the steam and condensed steam permeate outwards to the extremities of the fodder ensuring full effectiveness and contact of the steam throughout the fodder. It has been found that with use of the manifold the temperature of a bale may exceed 100 degrees Centigrade.

As a result of the lances 2a, 2b, 2c and 2d, steam is introduced into the centre of the bale or receptacle of the fodder by placing the bale or receptacle 10 onto the manifold 1. Alternatively the manifold 1 can be forced into a bale 10 from the side or above. In whichever orientation the lances penetrate so as ensure steam reaches all of the bale. If the manifold is arranged to rest on the ground during operation, an optional foot or feet 7 may be provided or formed on the manifold to prevent damage to it, for example by shock loading that may occur when a bale is dropped onto the lances.

In an alternative embodiment one or more steam distribution manifolds 1 of various lengths (to accommodate different size bales and receptacles to ensure effective central penetration) is provided. Lances 2 may be of different lengths and optionally these may be removable and fitted onto a common manifold. Thus for example in the event of damage to a lance, it may be removed and replaced with a similar lance. Alternatively, where the manifold is required for use with larger bales, longer lances may be fitted to the manifold.

Steam and condensed steam permeate through the fodder increasing the temperature of the fodder to between 70 and at least 100 degrees Centigrade (depending upon ambient temperature) killing thermophilic and mesophilic mould spores and other living organisms as mentioned above and effectively steam treating the fodder as well as dampening dust spores thus restricting their ability to become airborne.

The steam is distributed from the reservoir, via the hose and through the lances and where the steam condenses the water content is absorbed, in the majority, by the fodder leaving it damp. As the moisture content within the fodder increases, the temperature rises exponentially due to the increased efficiency of water as a heat conducting medium within the fodder, compared to air in the fodder's dry state.

The fodder is exposed to continuous steam from the apparatus, typically for a period in excess of 30 minutes, typically approximately 40 minutes and the temperature rises within the bale exponentially during this period of time.

The aforementioned apparatus can be used either in open space or within an enclosed environment, such as horse box, stable or barn; in a designated closed container or in a moulded preform, for use with any of the aforesaid.

In an alternative embodiment a conveyor (or other form of delivery system) may be used to present a bale of hay/straw to a position, whereat the manifold is forced to impale the bale and introduce steam into the bale. The manifold may be operated by a hydraulic actuator or drive, a manual actuator or drive, a sprung-loaded actuator or drive; or a combination of these.

The invention has been described by way of embodiments only with modifications and alternatives, but having read and understood this description, further embodiments and modifications will be apparent to those skilled in the art. All such embodiments and modifications are intended to fall within the scope of the present invention as defined in the claims. By way of example the manifold could be formed from aluminum, which may be cast, or a metal alloy.

While the invention has been described with reference to the exemplary embodiments thereof, those skilled in the art will be able to make various modifications to the described embodiments of the invention without departing from the true spirit and scope of the invention.

What is claimed is:

1. An apparatus for heating a tied, compressed bale of animal fodder, said bale being tied with baler twine, so as to kill living organisms within said bale, comprising:
a source of steam comprising a sealed vessel capable of heating water at elevated pressure to more than its normal boiling point;
a steam manifold adapted to receive steam from said source of steam, which is coupled to said manifold by a high-pressure hose, said steam manifold is constructed of a metal alloy;
said steam manifold has an upper side and a lower side and defining passages for distributing steam to a plurality of tied bale penetrating lances that extend vertically upward from the upper side thereof, said lances being arranged in an array supported by said manifold, each said lance having a pointed end for penetration into said tied, compressed bale and an aperture formed in said lance for releasing said steam;
a plurality of feet that project downwardly from the lower side of the manifold;
wherein said tied, compressed bale penetrating lances arranged in said array are adapted, in use, to penetrate said tied, compressed bale of animal fodder;
wherein said steam manifold and said tied, compressed bale penetrating lances are in a designated closed container and said steam manifold is adapted to rest on a surface in said designated closed container with the feet resting on the surface so that, in use, said tied, compressed bale penetrating lances are arranged to impale said tied, compressed bale of animal fodder, by placing or dropping said tied, compressed bale thereon, so that a weight of said tied, compressed bale assists penetration of said tied, compressed bale penetrating lances into a bulk of said tied, compressed bale; and
whereby, when said lances have penetrated into said tied, compressed bale, steam is released through said apertures in said lances into an interior volume of said tied, compressed bale of animal fodder such that steam delivered to said lances permeates outwards from said lances to extremities of said fodder, for contact of said steam throughout said fodder, to kill living organisms therein and whereby, after said injection of steam, said baler twine is cut and the fodder is distributed
wherein the pointed end of each lance comprises a conical-shaped end, and each lance further includes a plurality of vertical ribs on an outer surface thereof disposed beneath the conical-shaped end, and the vertical ribs are tapered in width such that the width of each rib increases as the rib extends away from the conical-shaped end, wherein the conical-shaped end and the vertical ribs provide each lance with a tapered shape.

2. The apparatus according to claim 1, wherein said lances comprise:
two, three, four or five tied, compressed bale penetrating lances arranged in a form that enhances even distribution of steam throughout said tied, compressed bale of fodder.

3. The apparatus according to claim 1, wherein said source of steam comprises:
an immersion heater, and
a thermostat cut-off switch.

4. The apparatus according to claim 3, wherein said source of steam comprises:
a residual current detector (RCD) for isolating an electricity supply in the event of a fault.

5. The apparatus according to claim 1, wherein:
different length tied, compressed bale penetrating lances are provided for use with different sized tied, compressed bales.

6. The apparatus according to claim 5, wherein:
said tied, compressed bale penetrating lances are removable.

7. The apparatus according to claim 1, wherein:
said apparatus is in a moulded preform.

8. The apparatus for according to claim 1, wherein:
said steam is injected into a central portion of said tied, compressed bale and percolates through said bale from the centre outwards.

9. The apparatus according to claim 1, wherein:
said manifold is in the form of a generally square frame and supports said lances, in said array of lances, at corners of said generally square frame.

10. The apparatus according to claim 1, wherein:
said tied, compressed bale is heated to a temperature in excess of 100 degrees Centigrade.

11. The apparatus according to claim 1, wherein the feet are positioned directly opposite the lances.

12. The apparatus according to claim 1, wherein the manifold includes a plurality of lance mounts that project upwardly from the upper side of the manifold, the lances are mounted on the lance mounts, and further comprising ribs extending between the lance mounts and the upper side of the manifold.

13. An apparatus configured to heat a bale of animal fodder with steam so as to kill living organisms within the bale, comprising:
a steam manifold adapted to receive steam from a source of steam, the steam manifold is constructed of metal;
the steam manifold includes a generally square frame with an upper side, a lower side, and a plurality of steam distribution passages formed in the generally square frame;
a plurality of bale penetrating lances extend vertically upward from the upper side of the generally square frame, each bale penetrating lance includes a base end and a tip end with the base end positioned between the tip end and the upper side of the generally square frame, each bale penetrating lance has a tapered shape from the tip end to the base end; and
each bale penetrating lance includes a steam passageway therein that is in fluid communication with one of the steam distribution passages in the generally square frame so as to receive steam, and at least one steam release aperture that communicates the steam passageway with an exterior of the bale penetrating lance
wherein the tip end of each bale penetrating lance has a conical-shaped, and each lance further includes a plurality of vertical ribs on an outer surface thereof disposed beneath the conical-shaped end, and the vertical ribs are tapered in width such that the width of each rib increases as the rib extends away from the conical-shaped end, wherein the conical-shaped end and the vertical ribs provide each lance with a tapered shape.

14. The apparatus according to claim 13, further comprising a plurality of feet that project downwardly from the lower side of the generally square frame directly opposite the bale penetrating lances.

15. The apparatus according to claim 13, wherein the generally square frame includes a plurality of lance mounts that project upwardly from the upper side thereof, the base ends of the bale penetrating lances are mounted on the lance mounts, and further comprising ribs extending between the lance mounts and the upper side of the generally square frame.

16. An apparatus configured to heat a bale of animal fodder with steam so as to kill living organisms within the bale, comprising:
- a steam manifold adapted to receive steam from a source of steam, the steam manifold is constructed of metal;
- the steam manifold is a generally square frame that in use is arranged horizontally on a floor; the generally square frame includes an upper side, a lower side, and a plurality of steam distribution passages formed in the generally square frame;
- the generally square frame includes a plurality of lance mounts that project upwardly from the upper side thereof;
- a plurality of bale penetrating lances extend vertically upward from the upper side of the generally square frame, each bale penetrating lance includes a base end mounted on one of the lance mounts and a tip end with the base end positioned between the tip end and the upper side of the generally square frame, and each bale penetrating lance has a tapered shape from the tip end to the base end;
- each bale penetrating lance includes a steam passageway therein that is in fluid communication with one of the steam distribution passages in the generally square frame so as to receive steam, and at least one steam release aperture that communicates the steam passageway with an exterior of the bale penetrating lance;
- ribs extending between the lance mounts and the upper side of the generally square frame;
- the tip end of each bale penetrating lance has a pointed, conical-shape;
- each bale penetrating lance further includes a plurality of vertical ribs on an outer surface thereof disposed beneath the pointed, conical-shaped tip end, the vertical ribs are tapered in width such that the width of each vertical rib increases as the vertical rib extends away from the pointed, conical-shaped tip end, wherein the conical-shaped tip end and the vertical ribs provide each bale penetrating lance with the tapered shape; and
- a plurality of feet that project downwardly from the lower side of the generally square frame directly opposite the bale penetrating lances.

17. The apparatus according to claim 16, wherein each bale penetrating lance includes a plurality of steam release apertures that communicate the steam passageway with an exterior of the bale penetrating lance, and for each bale penetrating lance at least some of the steam release apertures are disposed between adjacent ones of the vertical ribs.

18. The apparatus according to claim 16, wherein each bale penetrating lance has a circular portion beneath the tip end thereof, and the vertical ribs are disposed on the circular portion.

* * * * *